May 21, 1935. A. M. WOLF 2,001,860
JACKING APPARATUS FOR AUTOMOTIVE VEHICLES
Filed June 15, 1931 4 Sheets-Sheet 1
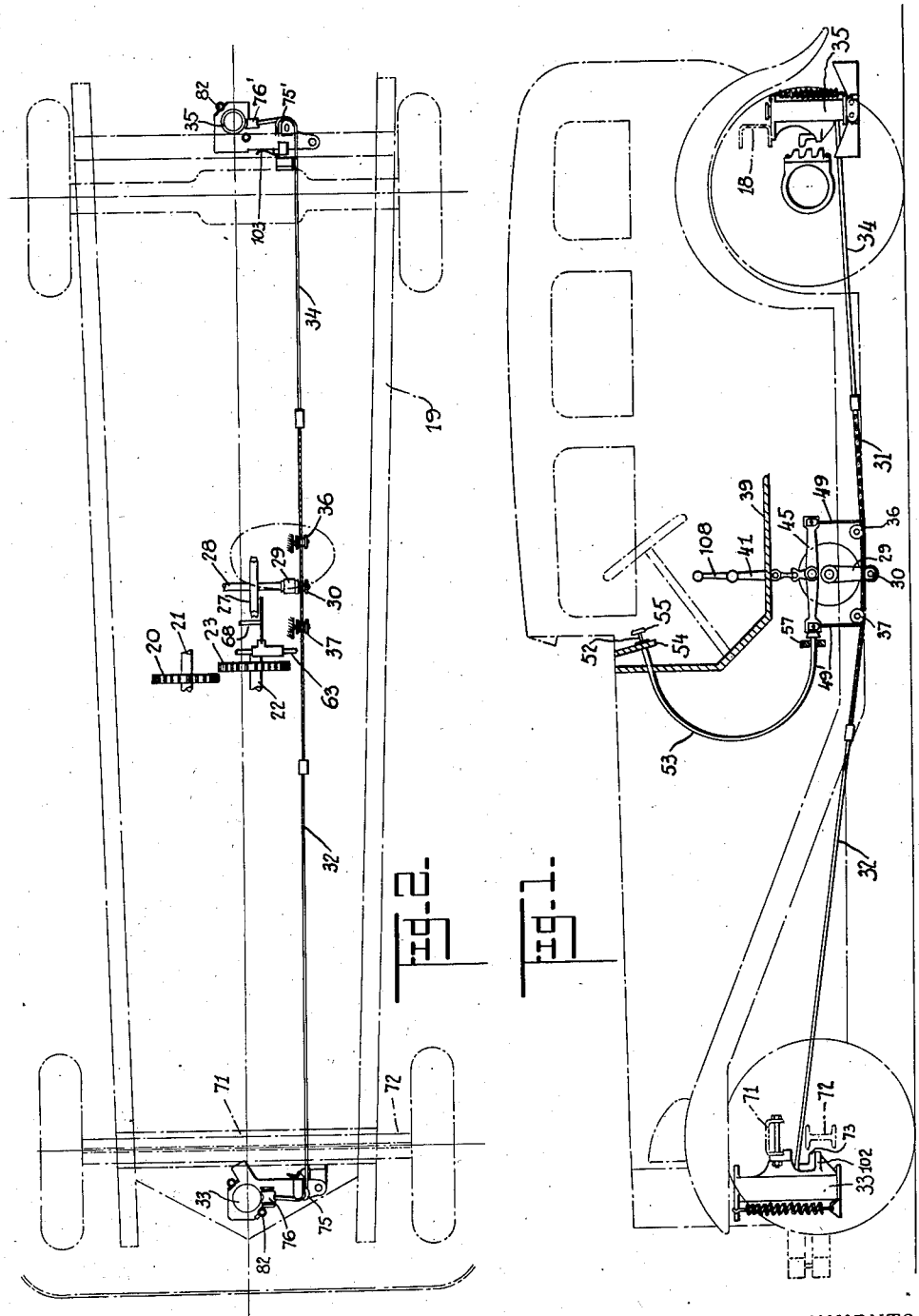
INVENTOR
Austin M. Wolf.
BY
Maxwell E. Sparrow
ATTORNEY May 21, 1935. A. M. WOLF 2,001,860
JACKING APPARATUS FOR AUTOMOTIVE VEHICLES
Filed June 15, 1931 4 Sheets-Sheet 2

INVENTOR
AUSTIN M. WOLF.
BY
Maxwell E. Sparrow
ATTORNEY

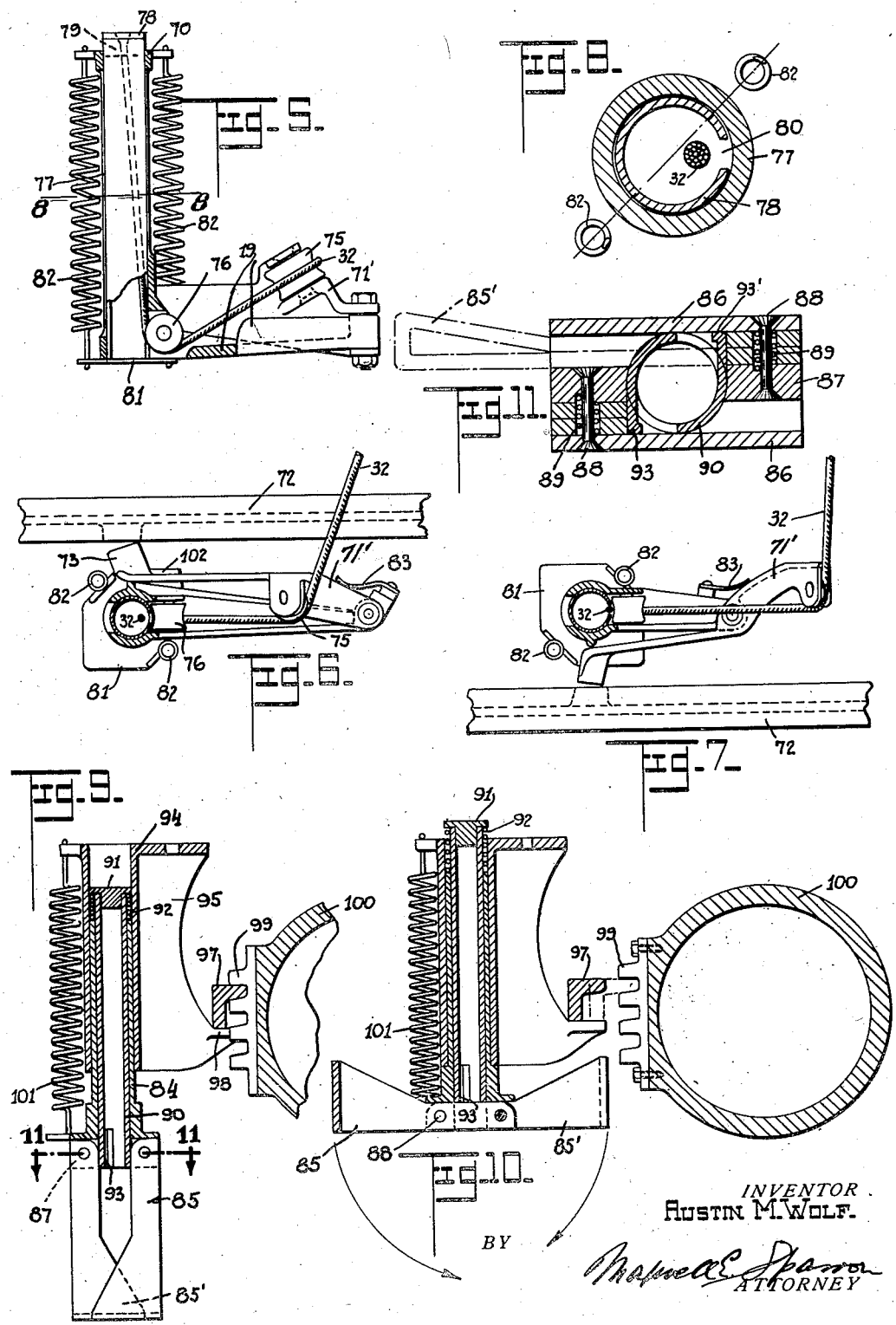

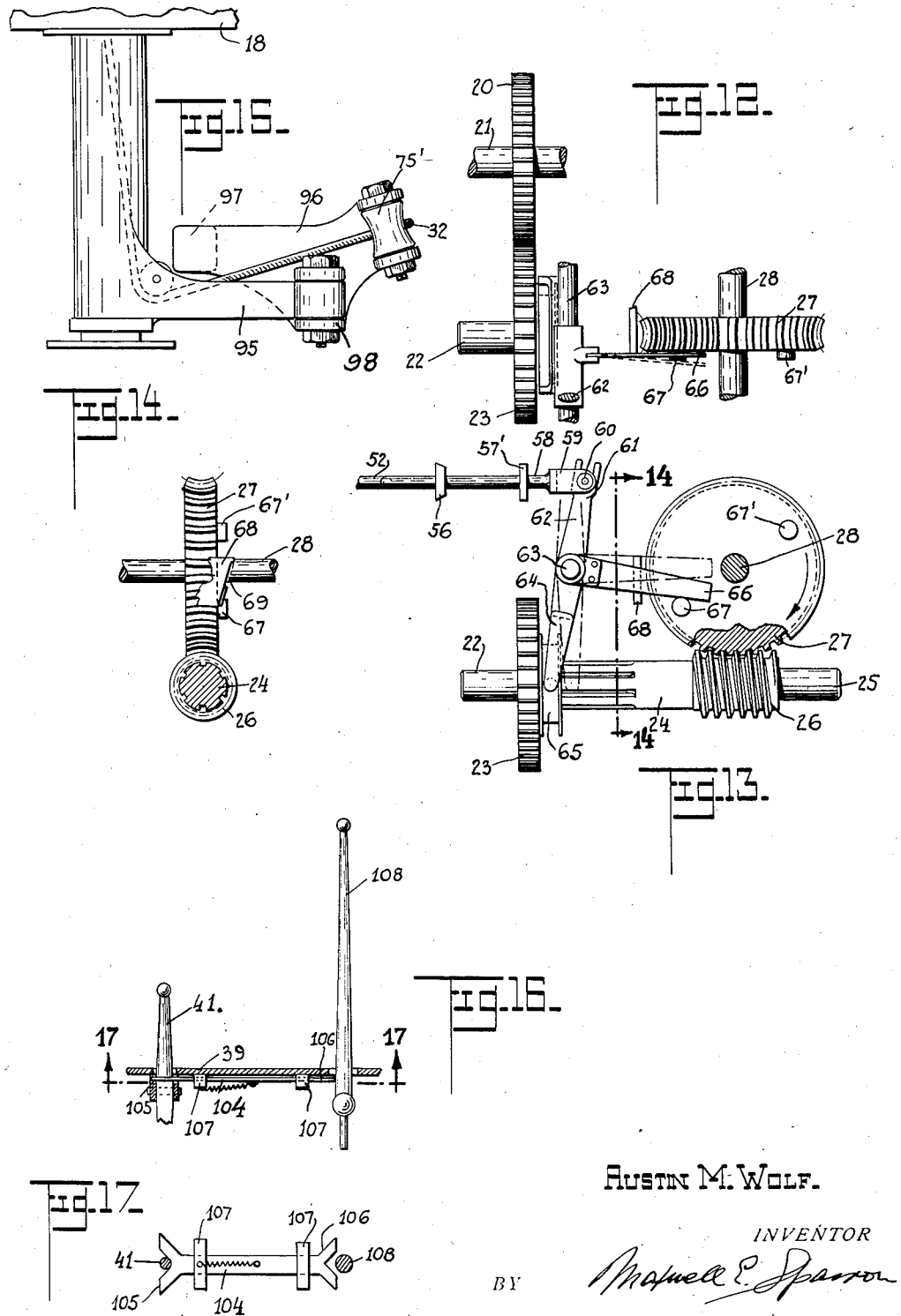

Patented May 21, 1935

2,001,860

UNITED STATES PATENT OFFICE 2,001,860

JACKING APPARATUS FOR AUTOMOTIVE VEHICLES

Austin M. Wolf, Plainfield, N. J., assignor to Motor Jack Corporation, New York, N. Y., a corporation of New York Application June 15, 1931, Serial No. 544,658

21 Claims. (Cl. 254—86)

This invention relates to jacking apparatus for automotive vehicles.

An object of the present invention is to provide an automotive vehicle with a jack unit disposed centrally thereof on the sprung portion of the chassis on each end of the vehicle such as the chassis frame, a power take-off associated with the transmission, and tension mechanism therebetween, the system being built into the motor vehicle and whereby the power required to operate the jacks, is derived from the engine of the car.

A further object of the invention resides in the provision of means for raising an unsprung portion of the chassis of the vehicle, such as the axle and by which said axle is maintained in fixed relation to the sprung portion of the chassis during the jacking operation, so that the tendency of the springs to extend while the vehicle is being raised is counteracted.

A further object of the invention is to provide jacking apparatus for automotive vehicles having a power take-off associated with the transmission of the vehicle, jacks at the front and rear of the vehicle provided with swingable locks and tension mechanism between the jacks and power take-off whereby either jack may be selectively locked against the axle and then extended, provision being made for releasing the tension on the jack whereby the jack is returned to inoperable position when it is desired to lower the vehicle.

A further object of the invention resides in providing dash control means for locking the power take-off until either jack has been selected and put in condition for operation.

A further object of the invention is in the provision of jacking apparatus for motor vehicles, comprising a jack at the front and at the rear of the vehicle, a power take-off, a flexible member connecting the jacks, mechanism cooperating with the power take-off for pulling the member, mechanism for locking the member whereby the pull is exerted on one of the jacks only, means to engage the locking mechanism, a dash control for actuating the power take-off, and means for preventing the operation of the dash control until the locking means shall have been actuated.

A further object of the invention is to provide jacking apparatus for a motor vehicle having a transmission gear, which comprises a jack, a power take-off to engage with the transmission gear, tension mechanism including a flexible member between the jack and the power take-off and means cooperating with the power take-off for pulling the member to extend the jack, and mechanism to automatically disengage the power take-off from the gear when the jack reaches the limit of its movement in either direction.

A further object of the invention is to provide in a jacking apparatus for motor vehicles, a jack having a housing, an extendible member operable from the housing and having swingable feet, and tension mechanism for first causing movement of the feet to operable position and then causing projection of the extendible member from the housing.

These and other objects which will become more apparent as the description progresses are obtained by the novel construction and combination of parts hereinafter described and shown in the accompanying drawings forming material part of this disclosure, and in which:

Fig. 1 is a side elevational view of an automotive vehicle with the jacking apparatus applied, the vehicle body being shown in phantom outline.

Fig. 2 is a top view of same.

Fig. 5 is a side view partially in section of a form of jack used in the invention.

Fig. 6 is a top view of same, showing the jack positioned in front of the vehicle axle.

Fig. 7 is a top view of same showing the jack positioned in the rear of the axle.

Fig. 8 is a sectional view taken along line 8—8 of Fig. 5.

Fig. 9 is a modified form of jack with variable locking device, the jack being shown in operable position.

Fig. 10 is a view showing the jack described in Figure 9, in normal position.

Fig. 11 is a section taken along line 11—11 of Figure 9 indicating in phantom lines one extension foot of spacer in horizontal position.

Fig. 12 is a plan view of power take-off engaging transmission gear.

Fig. 13 is a side elevational view of the same.

Fig. 14 is a section taken along line 14—14 of Figure 13.

Fig. 15 is a side elevation of the form of jack shown in Figures 9 and 10.

Fig. 16 is a side view of an automatic safety control used in the invention.

Fig. 17 is a sectional view taken along lines 17—17 of Figure 16.

Figure 3:
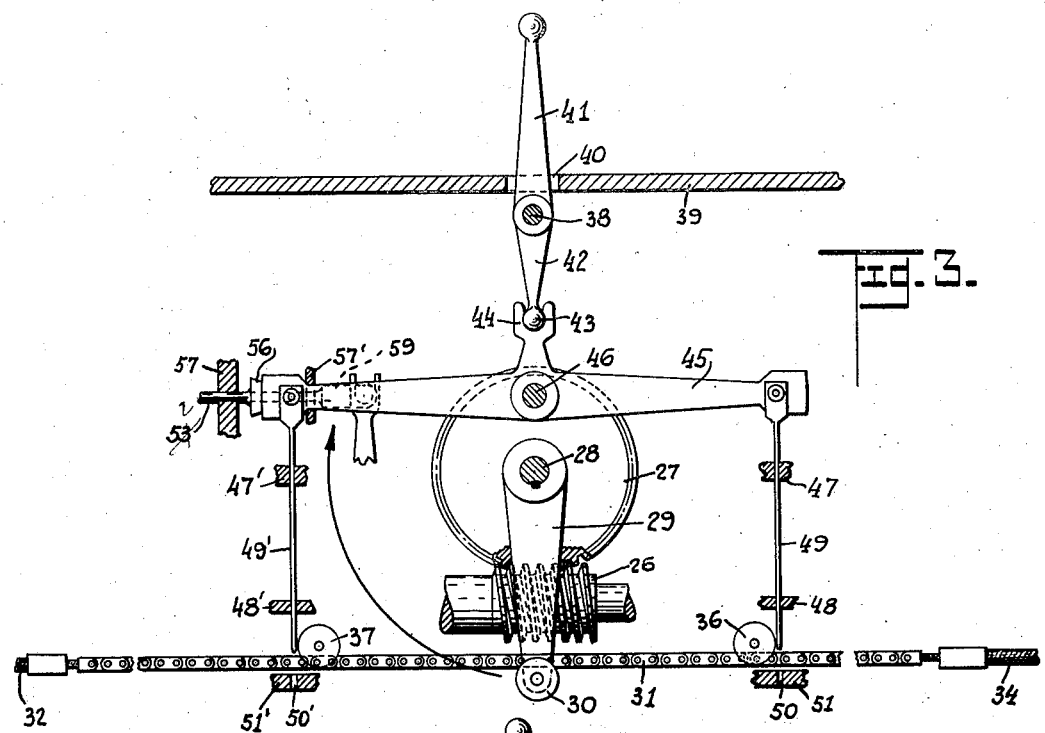
Fig. 3 is a part sectional view of control and pull mechanism in normal position.

The description of an embodiment of the invention follows:

Starting with the power take-off, and referring to Figures 2 and 12, the driving gear 20 fixed on a rotatable shaft 21 forming part of the conventional transmission system of a motor vehicle is shown. Fixed to a rotatable shaft 22 suitably mounted on the vehicle frame (the mounting of the shaft not being shown in the drawings) is a driven gear 23 adapted to slidably engage the gear 20 for which purpose the shaft 22 is splined to the shaft 24 thereby permitting longitudinal movement of the shaft. The end 25 of shaft 24 is suitably supported for rotation in a bearing fixed to a frame member of the vehicle. The bearing or frame member is not shown in the drawings.

Provided on the shaft 24 is a worm 26 for engagement with a worm wheel 27 fixed on a shaft 28 mounted on a frame member (not shown) of the vehicle in any suitable manner.

The cable take-up mechanism follows: Fixed to the shaft 28 to rotate therewith is a pulley arm 29 provided at its lower end with a grooved roller 30 for guiding a chain 31 coupled at one end to a cable 32 connected to the front jack 33, and coupled at its other end to a cable 34 connected to the rear jack 35 of the vehicle. Grooved rollers 36 and 37, mounted on frame members (not shown) of the vehicle and interposed at either side of the arm 29, further guide the chain 31.

Pivotally mounted on a shaft 38, disposed beneath the floor board 39 of the vehicle, and projecting through the opening 40 of the latter, is a lever handle 41, the said lever 41 being provided with a downwardly projecting arm 42 having a balled end 43 for engagement within a forked socket 44 of an equalizing lever arm 45 centrally pivoted for rotation on a shaft 46. The shafts 38 and 46, are secured to the frame members (not shown) of the vehicle in any suitable manner. Pivotally attached to the ends of the equalizing lever 45 and guided in the frame members 47, 48, 47', and 48', respectively, are rods 49, 49'.

Figure 4:
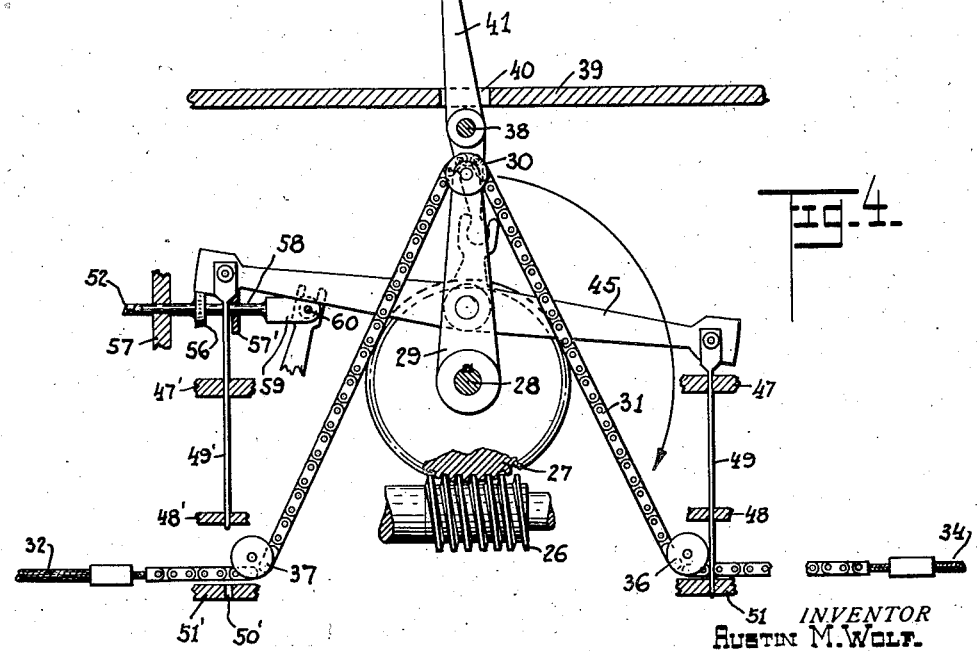
Fig. 4 is a part sectional view of control and pull mechanism showing position of parts when one end of vehicle is jacked up.

It will be seen from Figures 1, 3 and 4, that if the lever 41 be moved towards the front jack, the free end of rod 49' will be lowered to project through a perforation in the chain 31 and be lodged in the opening 50' in the frame member 51', and if the handle 41 is moved towards the rear jack, the rod 49' will disengage the frame member 51' and the chain 31, and the free end of rod 49 will be lowered to project through an opening in the chain 31 and be lodged in the opening 50 of the frame member 51.

The control mechanism comprises a wire or cable 52 freely encased in the casing 53 such as, a Bowden wire, one end of which projects through an opening in the dash 54, and to which is attached a dash button 55. Near the other end of the flexible wire 52 and attached thereto is a stop member or shoulder 56 which is in alignment with one end of the equalizing lever 45 when the latter is in neutral position, and which prevents further movement of the wire 52 until the lever arm 45 is made to swing in either direction. The wire 52 is supported near this end by the frame member 57. The lower portion of the wire 52 is guidedly supported by the frame member 57' and secured to the lower end 58 thereof is a jaw 59, having a pin 60.

The power take-off clutch mechanism comprises the lever arm 62 having its bifurcated end 61 in pivotal engagement with the pin 60 and fulcrumed at the frame member 63, the other end 64 of the lever 62 being forked to straddle a grooved member 65 secured to or forming part of the gear 23. Secured to the lever 62 preferably centrally thereof, is a spring trip lever 66 which projects over a face of the worm wheel 27 and in the path of the studs or trip pins 67 and 67', projecting from the said face of the worm wheel 27. The pins 67, 67' are disposed 180° apart. Adjacent the spring lever 66 is a member 68 having an inclined surface 69 on which the leaf 66 is made to ride in a manner and for a purpose hereinafter described. The member 68 is fixed to the vehicle frame by any suitable means not shown.

A type of jack used in the invention for raising the front part of the vehicle is shown in Figures 5, 6, 7, and 8, of the drawings. The jack housing 70 is fixed to the front cross member 71 disposed above the front axle 72 and in alinment therewith. Swingably attached to a lateral extension 19 of the housing 70 is an arm 71' having an L shaped axle lock 73 supported on a shelf 102 provided by the housing 70 and which is adapted to slide along the shelf to lock against the axle 72 when the arm 71' is caused to be swung in a manner hereinafter described. On the arm 71' is mounted a pulley 75 and another pulley 76 is mounted on the housing 70 adjacent its upwardly extending portion 77 which slidingly houses the hollow jack stem 78 or plunger. The cable 32 coupled to chain 31, associated with the actuating mechanism, is trained over pulley 75 and under pulley 76 and drawn through the hollow of jack stem 78 for attachment to the upper end thereof by a plug 79. The jack stem is preferably C shaped in cross section to provide an opening or a space 80 for the cable 32. The bore of the housing and the jack stem is shown as being cylindrical as this construction works for economy, but it is understood that the housing and stem may be made to assume any desirable shape. The jack stem 78 is provided with a foot 81 at its lower end and attached to the said foot and top of housing 70 are extensible or retractable springs 82 for the purpose of normally retaining the stem 78 in the housing 70. A spring 83 attached to the lateral extension 70 engages with the lock arm 71' to disengage the lock 73 from and hold it out of engagement with the axle 72 when the jack is in inoperable position.

The jack may be arranged either in front of the axle as shown in Figure 6, or at the rear thereof as shown in Figure 7, the only difference being in the arrangement of the pivot point.

A type of jack used in the invention for raising the rear part of the vehicle is shown in Figures 9, 10, and 11. In this type the jack stem encased by the housing 94 fastened to the rear cross frame member 18 comprises a sleeve 84 to which are pivotally or swingably attached at its expanded lower end the drop feet or spacers 85. The drop feet are preferably formed of a single stamping shaped in such manner so that when the material is bent over itself a flared base 85' is formed triangular in cross-section.

Each drop foot 85 is pivotally arranged between a plate 86 and the elongated portion 87 of sleeve 84. For this purpose a rivet 88 passes through the plate, the top end of the foot and spacing portion 87 thereby securing them together. The opening in the foot through which the rivet 88 passes is enlarged to receive a torsion spring 89, one end of the torsion spring being connected to the portion 87 and the other end to the foot by any desirable means not shown. In this manner the feet are returned and normally held in horizontal position when the jack is in inoperative position.

Slidably engaging the sleeve 84 is a plunger 90, having a flanged plug 91 at its end to provide a bearing surface for a helical spring 92, the latter being seated on the end of the sleeve 84. It is to be observed that the sleeve 84 is shorter than the plunger 90, whereby the spring 92, may be accommodated to take up the plunger. The lower end of the plunger 90 is flared out as shown at 93 and 93', to form a bearing surface for contact with the feet 85 as the latter are being swung by extension of the plunger, to operative position.

Extensible springs 101 are attached at one of their ends to the top of the housing 94 and at the other of their ends to the expanded lower end of sleeve 84.

The jack housing 94 is provided with a laterally extending portion 95 to which is pivotally or swingably attached an arm 96 having an L shaped axle lock 97 supported on a shelf 98 provided on the housing extension 95 and which is adapted to slide along the shelf to lockingly engage a rack 99, between adjacent teeth thereof when the arm 96 is caused to swing in a manner hereinafter described, the rack being fastened to the rear axle housing 100. A pulley 76' is mounted on the arm 96 and another pulley 76' is mounted on the jack housing 94 for the purpose hereinabove stated with reference to the front jack. The rack 99 is provided with a plurality of teeth for variable engagement of the lock depending upon the load in the vehicle.

Although the jack illustrated in Figures 5, 6, 7 and 8, are shown applied to the front axle and the jack illustrated in Figures 9, 10 and 11, are shown applied to the rear axle, it is to be understood that two of the former type or two of the latter type may be used. The jacks are mounted centrally of the front and rear of the vehicle, one at each end.

Assuming that it is desired to raise the front of the vehicle, the lever handle 41 is moved towards the front jack whereby the equalizing lever 45 is oscillated to lower and project the rod 49 through the link of the chain 31 and into the socket 50. This operation prevents the cable 34 being pulled and allows operation of the front jack. The equalizing lever is then in the position shown in Figure 4, by virtue of which the lock 56 on the power take-off clutch is free to move. Pushing dash button 55 shifts wire 52 and since the lock 56 is clear of the equalizing lever, the movement of the wire will cause engagement of the lock with the bottom of arm 45 (see Figure 4) and will shift the fork 61 which in turn will shift gear 23 in engagement with gear 20. Motion will then be transmitted from gear 20 to gear 23 turning worm 26 from which motion is transmitted to worm wheel 27. Rotation of worm wheel 27 causes the arm 29 to rotate in the direction indicated by the arrow in Figure 3, producing a tension on the chain 31 and consequently the cable 32 attached thereto. As the cable 32 is being pulled the arm 71' of the front jack swings on its pivot and the lock 73 is made to bear against the axle 72 under its top flange. Further tension on the chain and cable by the continued rotation of pulley arm 29 causes the jack stem 78 to be extended as the cable is being pulled. The worm wheel 27 rotates until the approaching pin 67 or 67' abuts against spring trip lever 66 when the latter is carried with the worm wheel and made to ride the inclined plane 69. This movement of the trip lever 66 swings the shift arm 62 to which it is attached which in turn causes disengagement of gear 23 from driving gear 20. The trip lever 66 on reaching its maximum position on the inclined plane 69 has freed itself from the pin on worm wheel 27. The shift arm 62 in being swung as just stated pushes wire 52 to which it is attached, and hence the control knob 55 is pushed outwardly with respect to the dash. When the jack is fully extended the pulley arm 29 is in the position shown in Figure 4.

To lower the vehicle the dash control knob 55 is again pushed and the power take-off put in action as above described. The pulley arm 29 continues its rotation in the same direction as shown by the arrow in Figure 4 as a result of which tension on the chain and cable is slackened which permits retraction of the jack stem and the vehicle is lowered.

By this time the other of the pins 67, 67', has carried the trip lever 66 to cause disengagement of gear 23 from driving gear 20 and disengagement of trip lever 66 from the pin has been effected as hereinabove described. Spring 83 causes disengagement of the jack from the axle 72.

It is understood that pins 67, 67' are so positioned on the worm wheel 27 that disengagement of the power take-off from the driving gear takes place at the limits of extension and retraction of the jack.

Assuming, now, that it is desired to raise the rear of the vehicle, the lever handle 41 is moved towards the rear jack whereby the lever 45 is swung to lower the rod 49' into the socket 50' thus locking the chain to prevent movement of cable 32 and allowing operation of the front jack. The lock 56 on the power take-off clutch is now free to move and pushing dash button 55 attached to wire 52 causes engagement of lock 56 with the top of arm 45 and shifts fork 61 to actuate the power take-off. A tension on chain 31 is produced as in the operation of the front jack and cable 34 is pulled which swings the arm 96 on its pivot to slide the lock 97 for engagement with rack 99. As the cable is further pulled plunger 90 is depressed against the action of spring 92 forcing the feet 85 with which it contacts to be swung downwardly and held in this operable position by its projected ends 93, 93'. As the cable is still further pulled, sleeve 84 carrying feet 85 is projected thus raising the vehicle. The vehicle is lowered in a manner similarly described for the front jack. After the tension on cable and chain has been released, the lock 97 is automatically disengaged from rack 99 by the spring 103, the plunger 90 is retracted by the spring 92, and the feet spring into inoperable position by the springs 89.

It is to be observed that the push control 55 cannot be operated to actuate the power take-off clutch until the lever handle 41 is first moved to set the mechanism to work either jack. After the mechanism has been set to work either jack, by virtue of the engagement of lock 56 on the power take-off clutch with either the top or the bottom of the chain locking lever 45, as the case may be, it is impossible to again operate lever handle 41 to "upset" the mechanism until the power take-off clutch has been automatically released to throw the power take-off out of action.

Since the jack is fastened to the vehicle frame and made to lockingly engage with the axle when in operation, the unsprung portion of the vehicle is raised, the axle being maintained in fixed relation to the chassis during the jacking operation. Due to this locking engagement, as the vehicle is being raised, the leaf springs between the chassis and the axle, are prevented from extending or distending so that the jack from the moment its foot touches the ground, is utilized without any lost movement to raise the vehicle.

It is to be observed that during the jacking operation, the effective length of the tension member which actuates the jack remains unchanged. By "effective length" of the tension member is meant the actual length thereof doing work. For example, if a cable is partly wound on a drum, the wound part of the cable does no work, and the effective length of the cable would be the unwound part thereof.

To prevent the motor vehicle being operated through inadvertence while the jack is in raised position, there is provided a yoke 104 having Y shaped bifurcated ends 105, 106, and slidably arranged on the floor of the vehicle by the brackets 107. The jack operating lever 41 is in alinement with the vehicle gear shift lever 108 and so disposed with relation to each other and yoke 104 that when one of the levers is shifted it will slide the yoke 104, which it engages between the furcations, and the yoke 104 will lockingly engage the other lever between the furcations at its other end. This prevents the gear shift lever being operated while the jack is functioning.

Having described my invention, what I claim as new and desire to secure by Letters Patent, is:

1. In jacking apparatus for automotive vehicles provided with a chassis having a sprung and an unsprung portion, a jack disposed on the sprung portion, and means to automatically lock the jack to the unsprung portion prior to the movement of the jack.

2. In jacking apparatus for automotive vehicles provided with a chassis having a sprung and an unsprung portion, a jack disposed on one of the portions, means to automatically lock the jack to the other of the portions prior to the movement of the jack, and means to operate the jack.

3. In jacking apparatus for automotive vehicles provided with a chassis having a sprung and an unsprung portion, a jack disposed on one of the portions, a power take-off to operate the jack, and means to automatically lock the jack to the other of the portions prior to the movement of the jack whereby the sprung and unsprung portions of the chassis are maintained in fixed relation with respect to each other during the jacking operation.

4. In jacking apparatus for automotive vehicles provided with a chassis having a sprung and an unsprung portion, a jack disposed on one of the portions, a power take-off, means interposed between the power take-off and the jack to operate the latter, and means to automatically lock the sprung and unsprung portions of the chassis prior to the movement of the jack whereby they are simultaneously raised during the jacking operation.

5. In jacking apparatus for automotive vehicles having a chassis provided with a sprung portion, a jack arranged on the sprung portion, a power take-off, and a tension member therebetween to actuate the jack, the effective length of said member being unchanged during the jacking operation.

6. In jacking apparatus for automotive vehicles provided with a chassis having an unsprung portion and a sprung portion, a jack arranged on one of the portions, means associated with the jack for automatically lockingly engaging the sprung portion with the unsprung portion, a power take-off, and a tension member operatively associated with the jack and power take-off to actuate the locking means and jack.

7. Jacking apparatus comprising a jack, a power-take-off and a tension member therebetween to actuate the jack, the effective length of said member being unchanged during the jacking operation.

8. Jacking apparatus comprising a jack, a power take-off, a tension member to extend the jack, the effective length of said member being unchanged during the jacking operation and means to return the jack to its normal position after being extended.

9. Jacking apparatus for automotive vehicles comprising a jack at the front and at the rear of the vehicle, a power take-off, a member connecting said jacks, and means cooperating with the power take-off for pulling said member to extend one of the jacks.

10. Jacking apparatus for automotive vehicles comprising a jack at the front and at the rear of the vehicle, a power take-off, a member connecting said jacks, means cooperating with the power take-off for pulling said member, and means for locking a portion of the member whereby the pull is exerted on one of the jacks only.

11. Jacking apparatus for automotive vehicles comprising a jack at the front and at the rear of the vehicle, a power take-off, a flexible member connecting said jacks, means cooperating with the power take-off for pulling said member, means for selectively locking a portion of the member whereby the pull is exerted on one of the jacks only, means to engage the locking mechanism, means to actuate the power take-off, and means for preventing operation of the latter until the locking means shall have been actuated.

12. Jacking apparatus for a motor vehicle having a transmission gear, comprising a jack, a power take-off to engage with the gear, a flexible member between the jack and the power take-off, means cooperating with the power take-off for pulling the member without changing its effective length to extend the jack, and means to automatically disengage the power take-off from the gear when the jack reaches the limit of its movement, in either direction.

13. In a jacking apparatus, a jack comprising a housing and an extendible member operable from the housing, a tension member of unchanged effective length to cause projection of the extendible member from the housing, and means to automatically return the member to normal position.

14. Jacking apparatus for automotive vehicles comprising a jack at the front and at the rear of the vehicle, a power take-off, driving means, a control at the dash to engage the power take-off with the driving means, a flexible member connecting said jacks, means cooperating with the power take-off for pulling said member, means for locking a portion of the member whereby the pull is exerted on one of the jacks only, and means for preventing operation of the control until the locking means shall have been actuated.

15. Jacking apparatus for automotive vehicles comprising a jack at the front and at the rear of the vehicle, a power take-off, driving means, a control at the dash to engage the power take-off with the driving means, a flexible member connecting said jacks, means cooperating with the power take-off for pulling said member, means for locking a portion of the member whereby the pull is exerted on one of the jacks only, means for preventing operation of the control until the locking means shall have been actuated, and means for automatically returning the control to normal position when the said jack has reached the limit of its movement in either direction.

16. In jacking apparatus for motor vehicles provided with a chassis having a sprung and an unsprung portion, a jack disposed on one of said portions of the chassis, a power take-off, a flexible member associated with said jack, means cooperating with the power take-off for pulling said member, means to actuate the power take-off, and means for automatically maintaining the sprung and unsprung portions of the chassis in fixed relation with respect to each other during the whole jacking operation.

17. In jacking apparatus for motor vehicles provided with a chassis having a sprung and an unsprung portion, a jack disposed on one of said portions of the chassis, a power take-off, driving means, a control at the dash to engage the power take-off with the driving means, a flexible member associated with said jack, means cooperating with the power take-off for pulling said member, and means for automatically maintaining the sprung and the unsprung portions of the chassis in fixed relation with respect to each other during the whole jacking operation.

18. In a jacking apparatus for use with a fixed element, a jack comprising a housing, an extendible member operable from the housing, said housing being pivotally connected to said element, a tension member for first causing movement of said housing about its pivot and then causing projection of the extendible member from the housing.

19. In combination, a lifting jack having a movable part, a power take-off, a tension member connecting said part and said power take-off for pulling the former, and means associated with the power take-off for pulling said member to actuate the jack.

20. In combination, a lifting jack having a movable part, a power take-off, a tension member connecting said part and said power take-off for pulling the former, and means associated with the power take-off for pulling said member to actuate the jack, said means comprising a lever arm engageable with the said member.

21. Jacking apparatus for automotive vehicles comprising a jack, a power take-off, driving means, a control at the dash to engage the power take-off with the driving means, a flexible member associated with said jack, and means cooperating with the power take-off for pulling said member.

AUSTIN M. WOLF.